United States Patent [19]
Kawasaki et al.

[11] Patent Number: 5,962,543
[45] Date of Patent: Oct. 5, 1999

[54] FOAM PROCESSABLE RUBBER COMPOSITIONS AND VULCANIZED RUBBER FOAM MOLDED PRODUCTS OF THE SAME

[75] Inventors: Masaaki Kawasaki; Shuichi Nonaka; Masao Kunizane; Taku Koda; Tetsuo Tojo, all of Ichihara, Japan

[73] Assignee: Mitsui Chemicals, Inc., Tokyo, Japan

[21] Appl. No.: 08/971,107

[22] Filed: Nov. 14, 1997

[30] Foreign Application Priority Data

Nov. 15, 1996 [JP] Japan .................................. 8-304644

[51] Int. Cl.$^6$ ................ C08J 9/00; C08L 23/16
[52] U.S. Cl. .......................... 521/140; 521/139; 525/232; 525/240
[58] Field of Search ..................... 521/139, 140; 525/232, 240

[56] References Cited

U.S. PATENT DOCUMENTS

| | | |
|---|---|---|
| 4,212,787 | 7/1980 | Matsuda et al. . |
| 4,739,547 | 4/1988 | Tanaka et al. . |
| 5,262,503 | 11/1993 | Gotoh ........................................ 521/150 |

FOREIGN PATENT DOCUMENTS 0794226  9/1997  European Pat. Off. .

OTHER PUBLICATIONS

Abstracts of Published International Patent Application No. WO 97/02316 Jan. 23, 1997.

*Primary Examiner*—Morton Foelak
*Attorney, Agent, or Firm*—Sherman and Shalloway

[57] ABSTRACT

Disclosed is a foam processable rubber composition which comprises an ethylene/α-olefin of 3 to 20 carbon atoms/non-conjugated polyene copolymer rubber (A), a crystalline polyolefin resin (B) having a melting point of 100 to 150° C. and a foaming agent (C), in specific proportions. The copolymer rubber (A) has an ethylene/α-olefin molar ratio of 60/40 to 80/20, an intrinsic viscosity (η), as measured in decalin at 135° C., of 0.7 to 2 dl/g, and an iodine value of 10 to 50. A vulcanized rubber foam-molded product can be obtained by vulcanizing and foaming the rubber composition. The rubber composition can provide vulcanized rubber foam-molded products having excellent vulcanization properties such as weathering resistance, heat resistance, ozone resistance and tear strength. Besides, the rubber composition exhibits excellent precision moldability and productivity of vulcanized rubber foam-molded products in transfer molding, injection molding and cast molding.

3 Claims, 2 Drawing Sheets

FOAM PROCESSABLE RUBBER COMPOSITIONS AND VULCANIZED RUBBER FOAM MOLDED PRODUCTS OF THE SAME

FIELD OF THE INVENTION

The present invention relates to foam processable rubber compositions which are capable of providing vulcanized rubber foam-molded products (sponge rubbers) having excellent vulcanization properties such as heat resistance, weathering resistance, ozone resistance and strength and which show excellent precision moldability and productivity in transfer molding, injection molding and cast molding. The invention also relates to vulcanized rubber foam-molded products obtained from the rubber compositions.

BACKGROUND OF THE INVENTION

Ethylene/α-olefin copolymers and ethylene/α-olefin/diene copolymers have no unsaturated bonds in their main chains, so that they show superior weathering resistance, heat resistance and ozone resistance to those of diene rubbers, and they have been broadly used for automobile industrial parts, industrial rubber parts, electrical insulating materials, civil engineering and building materials, and rubber products such as rubberized fabric. With demands of better performance and higher functions of these rubber parts and products, their shapes becomes more complicated, and therefore rubber materials having higher flowability are desired from the viewpoints of precision moldability and productivity in molding, for example, transfer molding, injection molding and cast molding.

As the rubber material, a low-molecular weight ethylene/α-olefin/diene copolymer, or a high-molecular weight ethylene/α-olefin/diene copolymer blended with a large amount of a process oil has been hitherto used.

However, the use of the low-molecular weight ethylene/α-olefin/diene copolymer may cause lowering of properties, partcicularly strength of molded products. On the other hand, use of the high-molecular weight ethylene/α-olefin/diene copolymer blended with a large amount of a process oil liable to stain a mold because of bleeding of the oil or to insufficiently vulcanize and thus to lower properties of the molded products.

Accordingly, there has been a need for foam processable rubber compositions which are capable of providing vulcanized rubber foam-molded products (sponge rubbers) having excellent vulcanization properties such as heat resistance, weathering resistance, ozone resistance and tear strength and which show excellent precision moldability and productivity in transfer molding, injection molding and cast molding, and vulcanized rubber foam-molded products of the rubber compositions.

OBJECT OF THE INVENTION

The present invention is intended to solve such problems associated with the prior art as mentioned above, and it is an object of the invention to provide a foam processable rubber composition which are capable of preparing vulcanized rubber foam-molded products (sponge rubbers) having excellent vulcanization properties such as weathering resistance, heat resistance, ozone resistance and tear strength and which show excellent precision moldability and productivity in transfer molding, injection molding and cast molding. It is another object of the invention to provide a vulcanized rubber foam-molded product of the rubber composition.

SUMMARY OF THE INVENTION

According to the present invention, there is provided a foam processable rubber composition which comprises 100 parts by weight of an ethylene/α-olefin of 3 to 20 carbon atoms/non-conjugated polyene copolymer rubber (A), 5 to 50 parts by weight of a crystalline polyolefin resin (B) having a melting point (Tm), as measured by DSC, of 100 to 150° C., and 0.5 to 50 parts by weight of a foaming agent (C), wherein the ethylene/α-olefin/non-conjugated polyene copolymer rubber (A) has the following properties:

(a) the molar ratio of ethylene to the α-olefin of 3 to 20 carbon atoms (ethylene/α-olefin) is in the range of 60/40 to 80/20, (b) the intrinsic viscosity (η), as measured in decahydronaphthalene (decalin) at 135° C., is in the range of 0.7 to 2 dl/g, and (c) the iodine value is in the range of 10 to 50.

The crystalline polyolefin resin (B) is preferably a 1-butene polymer, or a propylene copolymer having a melting point, as measured by DSC, of 135 to 145° C.

The present invention also provides a vulcanized rubber foam-molded product which is obtained by vulcanizing and foaming the above-mentioned rubber composition.

1: tubular sponge rubber

2: foam-molded product

DETAILED DESCRIPTION OF THE INVENTION

Figure 1A:
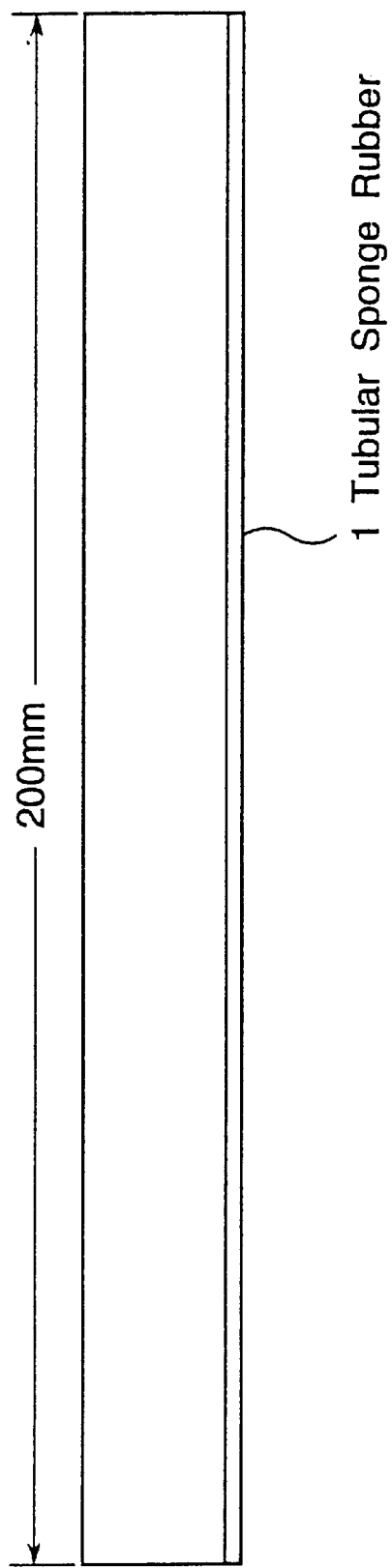
FIG. 1A is a front view of a vulcanized tubular sponge rubber used in the performance test in Examples.

The foam processable rubber composition and the vulcanized rubber foam-molded product of the composition according to the invention are described in detail hereinafter.

The foam processable rubber composition according to the invention comprises an ethylene/α-olefin/non-conjugated polyene copolymer rubber (A), a crystalline polyolefin resin (B) and a foaming agent (C), as described above. The rubber composition can also contain rubber compounding ingredients such as a vulcanizing agent (D), a vulcanization accelerator, a vulcanization assistant, a foaming assistant, in addition to the above components.

Ethylene/α-olefin/non-conjugated polyene copolymer rubber (A)

The ethylene/α-olefin/non-conjugated polyene copolymer rubber (A) for use in the invention is a random copolymer from ethylene, an α-olefin of 3 to 20 carbon atoms and a non-conjugated polyene.

Examples of the α-olefins include propylene, 1-butene, 1-pentene, 1-hexene, 4-methyl-1-pentene, 1-heptene, 1-octene, 1-nonene, 1-decene, 1-undecene, 1-dodecene, 1-tridence, 1-tetradecene, 1-pentadecene, 1-hexadecene, 1-heptadecene, 1-octadecene, 1-nonadecene and 1-eicosene. Of these, preferable are propylene, 1-butene, 4-methyl-1-pentene, 1-hexene and 1-octene. Thus, an ethylene/ propylene/non-conjugated polyene copolymer rubber, an ethylene/1-butene/non-conjugated polyene copolymer rubber, an ethylene/4-methyl-1-pentene/non-conjugated polyene copolymer rubber, an ethylene/1-hexene/non-conjugated polyene copolymer rubber and an ethylene/1-octene/non-conjugated polyene copolymer rubber are preferably employed.

In the ethylene/α-olefin/non-conjugated polyene copolymer rubber (A), the molar ratio of ethylene to the α-olefin of 3 to 20 carbon atoms (ethylene/α-olefin) is in the range of 60/40 to 80/20, preferably 63/37 to 77/23, more preferably 65/35 to 75/25.

As the non-conjugated polyene, a cyclic or chain non-conjugated polyene may be employed.

Examples of the cyclic non-conjugated polyenes include 5-ethylidene-2-norbornene, dicyclopentadiene, 5-vinyl-2-norbornene, norbornadiene and methyltetrahydrofuran. Examples of the chain non-conjugated polyenes include 1,4-hexadiene, 7-methyl-1, 6-octadiene, 8-methyl-4-ethylidene-1, 7-nonadiene and 4-ethylidene-1, 7-undecadiene.

These non-conjugated polyenes may be used singly or in combination of two or more, and the amount thereof in the copolymer is in the range of 10 to 50, preferably 15 to 40, more preferably 20 to 30, in terms of iodine value.

The ethylene/α-olefin/non-conjugated polyene copolymer rubber (A) has an intrinsic viscosity (η), as measured in decalin at 135° C., of 0.7 to 2 dl/g, preferably 0.8 to 1.5 dl/g.

In the present invention, the ethylene/α-olefin/non-conjugated polyene copolymer rubber (A) can be used singly or in combination of two or more.

The ethylene/α-olefin/non-conjugated polyene copolymer rubber (A) having the above properties can be prepared in accordance with conventional processes as described in "Polymer Preparation Process" (published by Kogyo Chosakai K.K., pp. 309–330).

Crystalline polyolefin resin (B)

The crystalline polyolefin resin (B) for use in the invention has a melting point (Tm), as measured by DSC (differential scanning calorimeter), of 100 to 150° C., preferably 110 to 145° C., more preferably 110 to 140° C.

Examples of the crystalline polyolefin resin (B) include:
a 1-butene polymer,
a 1-butene/α-olefin copolymer, such as a 1-butene/ethylene copolymer having a 1-butene content of not less than 90% by mol or a 1-butene/propylene copolymer having a 1-butene content of not less than 90% by mol,
a propylene polymer, and
a propylene/α-olefin copolymer, such as a propylene/ethylene copolymer having a propylene content of not less than 80% by mol, a propylene/1-butene copolymer having a propylene content of not less than 80% by mol or a propylene/ethylene/1-butene copolymer having a propylene content of not less than 80% by mol.

Of these, preferable are a propylene copolymer having a melting point of 135 to 145° C. and a 1-butene polymer. Particularly preferable is a 1-butene polymer.

When the crystalline polyolefin resin (B) is a propylene (co)polymer, the (co)polymer has a melt flow rate (ASTM D1238, 230° C., load of 2.16 kg) of usually 0.1 to 50 g/10 min, preferably 0.5 to 40 g/10 min, more preferably 1 to 30 g/10 min. When the crystalline polyolefin resin (B) is a 1-butene (co)polymer, the (co)polymer has a melt flow rate (ASTM D1238, 190° C., load of 2.16 kg) of usually 0.05 to 50 g/10 min, preferably 0.1 to 30 g/10 min, more preferably 0.5 to 20 g/10 min.

The crystalline polyolefin resin (B) has a crystallinity, as measured by X-ray diffractometry, of usually not less than 20%.

In the present invention, the crystalline polyolefin resin (B) is used in an amount of 5 to 50 parts by weight, preferably 10 to 40 parts by weight, more preferably 15 to 30 parts by weight, based on 100 parts by weight of the ethylene/α-olefin/non-conjugated polyene copolymer rubber (A). When the crystalline polyolefin resin (B) is used in such an amount, a rubber composition capable of providing a vulcanized rubber foam-molded product having excellent vulcanization properties such as weathering resistance, heat resistance, ozone resistance and strength can be obtained. The rubber composition exhibits excellent precision moldability and productivity in transfer molding, injection molding and cast molding.

Foaming agent (C)

Examples of the foaming agent (C) for use in the invention include sodium bicarbonate, sodium carbonate, ammonium bicarbonate, ammonium carbonate, ammonium nitrite, N,N'-dimethyl-N,N'-dinitrosoterephthalamide, N,N'-dinitrosopentamethylenetetramine, azodicarbonamide, azobisisobutyronitrile, azobiscyclohexylnitrile, azodiaminobenzene, barium azodicarboxylate, benzenesulfonylhydrazide, toluenesulfonylhydrazide, p,p'-oxybis (benzenesulfonylhydrazide), diphenylsulfone-3,3'-disulfonylhydrazide, calcium azide, 4,4'-diphenyldisulfonyl azide and p-toluenesulfonyl azide.

In the present invention, the foaming agent (C) is used in an amount of 0.5 to 50 parts by weight, preferably 1 to 40 parts by weight, more preferably 2 to 30 parts by weight, based on 100 parts by weight of the ethylene/α-olefin/non-conjugated polyene copolymer rubber (A).

Other components

In addition to the ethylene/α-olefin/non-conjugated polyene copolymer rubber (A), the polyolefin resin (B) and the foaming agent (C), the foam processable rubber composition according to the invention can contain various rubber compounding ingredients, such as vulcanizing agents (D), vulcanization accelerators, vulcanization assistants, foaming assistants, fillers, softeners, plasticizers, processing assistants, anti-aging agents, heat stabilizers, weathering stabilizers, antistatic agents, colorants, lubricants, thickeners and other ingredients, within limits not prejudicial to the objects of the invention.

As the vulcanizing agent (D), sulfur, a sulfur compound or an organic peroxide can be employed.

Examples of sulfur include powdered sulfur, precipitated sulfur, colloidal sulfur, surface-treated sulfur and insoluble sulfur.

Examples of the sulfur compounds include sulfur chloride, sulfur dichloride, high molecular weight polysulfides, and sulfur compounds which are capable of releasing active sulfur at a vulcanizing temperature to cause vulcanization, such as morpholine disulfides, alkylphenol disulfides, tetramethylthiuram disulfide and dipentamethylenethiuram tetrasulfide.

In the present invention, sulfur or the sulfur compound is used in an amount of usually 0.1 to 10 parts by weight, preferably 0.5 to 3 parts by weight, more preferably 1.0 to 3.0 parts by weight, based on 100 parts by weight of the ethylene/α-olefin/non-conjugated polyene copolymer rubber (A).

When sulfur or the sulfur compound is used as the vulcanizing agent (D), it is preferable to use a vulcanization accelerator in combination.

Examples of the vulcanization accelerators include:

thiazole compounds, such as N-cyclohexyl-2-benzothiazole sulfenamide, N-oxydiethylene-2-benzothiazole sulfenamide, N,N'-diisopropyl-2-benzothiazole sulfenamide, 2-mercaptobenzothiazole, 2-(2, 4-dinitrophenyl) mercaptobenzothiazole, 2-(2, 6-diethyl-4-morpholinothio) benzothiazole and dibenzothiazyl disulfide;

guanidine compounds, such as diphenylguanidine, triphenylguanidine, diorthonitrileguanidine, orthonitrile biguanide and diphenylguanidine phthalate;

aldehyde amine compounds and aldehyde ammonia compounds, such as acetaldehyde-aniline condensate, butylaldehyde-aniline condensate, hexamethylenetetramine and acetaldehyde ammonia;

imidazoline compounds, such as 2-mercaptoimidazoline;

thiourea compounds, such as thiocarbanilide, diethylthiourea, dibutylthiourea, trimethylthiourea and diorthotolylthiourea;

thiuram compounds, such as tetramethylthiuram monosulfide, tetramethylthiuram disulfide, tetraethylthiuram disulfide, tetrabutylthiuram disulfide and pentamethylenethiuram tetrasulfide;

dithiocarbomic acid salt compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate compounds, such as zinc dibutylxanthate; and other compounds, such as zinc white.

In the present invention, the vulcanization accelerator may be used in an amount of 0.1 to 20 parts by weight, preferably 0.5 to 15 parts by weight, more preferably 1 to 10 parts by weight, based on 100 parts by weight of the ethylene/α-olefin/non-conjugated polyene copolymer rubber (A).

There is no specific limitation on the organic peroxides, as far as they are compounds generally used for peroxide vulcanization. Examples of the organic peroxides include dicumyl peroxide, di-t-butyl peroxide, di-t-butylperoxy-3, 3, 5-trimethylcyclohexane, t-dibutyl hydroperoxide, t-butylcumyl peroxide, benzoyl peroxide, 2, 5-dimethyl-2, 5-di(t-butylperoxy)hexyne-3, 2, 5-dimethyl-2, 5-di (benzoylperoxy) hexane, 2, 5-dimethyl-2, 5-mono (tbutylperoxy) hexane and α, α'-bis(t-butylperoxy-m-isopropyl) benzene. Of these, dicumyl peroxide, di-t-butyl peroxide and di-t-butylperoxy-3, 3, 5-trimethylcyclohexane are preferable. These organic peroxides are used singly or in combination of two or more.

In the present invention, the organic peroxide may be used in an amount of usually $3 \times 10^{-3}$ to $5 \times 10^{-2}$ mol, preferably $1 \times 10^{-3}$ to $3 \times 10^{-2}$ mol, based on 100 g of the ethylene/α-olefin/non-conjugated polyene copolymer rubber (A). It is preferable to determine the amount of the organic peroxide used depending on properties required for vulcanized products.

When the organic peroxide is used as the vulcanizing agent (D), it is preferable to use a vulcanization assistant in combination. Examples of the vulcanization assistants include sulfur; quinonedioxime compounds, such as p-quinonedioxime; methacrylate compounds, such as polyethylene glycol dimethacrylate; allyl compounds, such as diallyl phthalate and triallyl isocyanurate; maleimide compounds; and divinylbenzene.

The vulcanization assistant may be used in an amount of 0.5 to 2 mol based on 1 mol of the organic peroxide, preferably equimolar amount with the organic peroxide.

As the foaming assistant, conventional foaming assistants are employable.

In the present invention, fillers not only having reinforcing properties but also having no reinforcing properties can be employed.

The filler having reinforcing properties exerts effect of improving mechanical properties of vulcanized rubbers, such as tensile strength, tear strength and abrasion resistance. Examples of such fillers include carbon black which may be surface treated with a silane coupling agent or the like, silica, activated calcium carbonate and finely powdered talc. In the present invention, carbon black of any type generally used for rubbers can be employed.

The filler having no reinforcing properties is used for the purpose of improving hardness of rubber products or reducing costs without so much influence on the properties of rubber products. Examples of such fillers include talc, clay and calcium carbonate.

The filler may be used in an amount of usually not more than 250 parts by weight, preferably not more than 200 parts by weight, based on 100 parts by weight of the ethylene/α-olefin/non-conjugated polyene copolymer rubber (A).

As the softeners, those generally used for rubbers are employable. Examples of the softeners include process oil, lubricating oil, paraffin, liquid paraffin, petroleum asphalt, vaseline, coal tar, castor oil, linseed oil, factice, beeswax, palmitic acid, stearic acid, barium stearate, calcium stearate, zinc laurate, atactic polypropylene and coumarone-indene resins. Of these, particularly preferable is process oil.

The softener may ne used in an amount of usually not more than 150 parts by weight, preferably not more than 100 parts by weight, more preferably not more than 70 parts by weight, based on 100 parts by weight of the ethylene/α-olefin/non-conjugated polyene copolymer rubber (A).

Preparation of rubber composition

The foam processable rubber composition according to the invention can be prepared by, for example, the following process.

In a mixer such as a Banbury mixer, the ethylene/α-olefin/non-conjugated polyene copolymer rubber (A), the polyolefin resin (B), and optionally, an additive such as a filler, a softener and a plasticizer are mixed and kneaded at 80 to 170° C. for about 3 to 10 minutes. Then, in a roll mill such as an open roll mill, to the kneadate are added the foaming agent (C), the vulcanizing agent (D), and optionally, a defoaming agent, a foaming assistant and a vulcanization accelerator or vulcanization assistant, and the mixture further kneaded at a roll temperature of 40 to 80° C. for 5 to 30 minutes, followed by rolling, to prepare a rubber composition. The rubber composition thus obtained is in the form of a ribbon or a sheet.

Vulcanized rubber foam-molded product

The vulcanized rubber foam-molded product according to the invention is a vulcanized foam-molded product of the above-described rubber composition of the invention.

The vulcanized rubber foam-molded product of the invention can be prepared in the following manner. The rubber composition obtained as above is molded by transfer molding, injection molding, cast molding or the like. Then, the molded product is introduced into a vulcanization zone and heated therein by means of hot air, a fluidized bed, a molten salt bath, microwave or the like to perform vulcanization and foaming.

EFFECT OF THE INVENTION

The foam processable rubber composition according to the invention can provide vulcanized rubber foam-molded products having excellent vulcanization properties, such as weathering resistance, heat resistance, ozone resistance and tear strength. Besides, the rubber composition shows excellent precision moldability and productivity of vulcanized rubber foam-molded products in transfer molding, injection molding and cast molding.

The vulcanized rubber foam-molded product according to the invention has such excellent vulcanization properties as mentioned above.

EXAMPLE

The present invention is further described with reference to the following examples, but it should be construed that the invention is in no way limited to those examples.

In the following examples, properties of the vulcanized rubber foam-molded products were measured by the test methods described below.

(1) Specific gravity

Figure 1B:
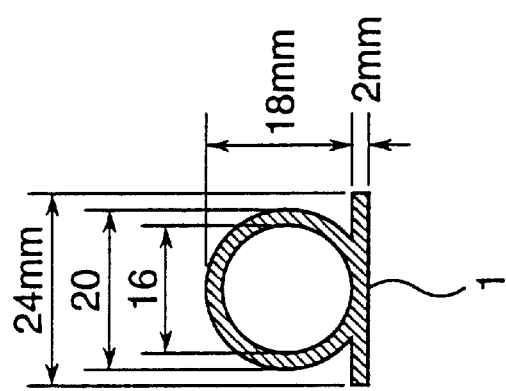
FIG. 1B is a transverse sectional view of the tubular sponge rubber.

From the upper part of a vulcanized tubular sponge rubber as shown in FIG. 1, a specimen of 20 mm×20 mm was punched out, and the surface of the specimen was wiped with alcohol to clean the surface. Then, the specimen was set at the given position of an automatic gravimeter (model No. M-1, manufactured by Toyo Seiki Seisakusho K.K.). From a difference between the mass of the specimen in the atmosphere and that in pure water, a specific gravity of the specimen was determined.

(2) Tensile strength test

From the upper part of a vulcanized tubular sponge rubber as shown in FIG. 1, a dumbbell specimen (dumbbell shape of No. 3) according to JIS K6301 (1989) was punched out in the lengthwise direction.

A tensile test of the specimen was carried out under the conditions of a measuring temperature of 25° C. and a stress rate of 500 mm/min in accordance with the method of JIS K6301-3, to measure a tensile stress at break $T_B$ and a tensile elongation at break $E_b$ of the specimen.

(3) Tear strength test

From the upper part of a vulcanized tubular sponge rubber as shown in FIG. 1, a strip specimen having a length of 120 mm and a width of 25 mm was punched out in the lengthwise direction, and was given a notch with a length of ⅓ the whole length of the punched strip from one end along the center line in the lengthwise direction (grain direction) by means of a single-blade cutter to obtain a specimen. After the thickness of the specimen was measured, both ends of the notched portion were fitted to a tensile tester at a chuck interval of 40 mm, and then was pulled until the specimen was torn to measure a tear strength ($T_r$) of the specimen.

(4) Permanent compression set test

A vulcanized tubular sponge rubber as shown in FIG. 1 was cut to give a specimen having a length of 30 mm. The specimen was placed in a mold for measuring sponge rubber permanent compression set and then compressed so that the height of the specimen (tube), namely, diameter of the tube, was made 50% of the original height (diameter). Thereafter, the mold with the specimen was heat-treated in a gear oven at 70° C. for 200 hours. After the heat treatment, the mold was taken out of the gear oven and allowed to stand for cooling for 30 minutes. The height of the specimen (tube) was measured, and the permanent compression set (CS) of the specimen was calculated from the following equation.

Figure 2A:
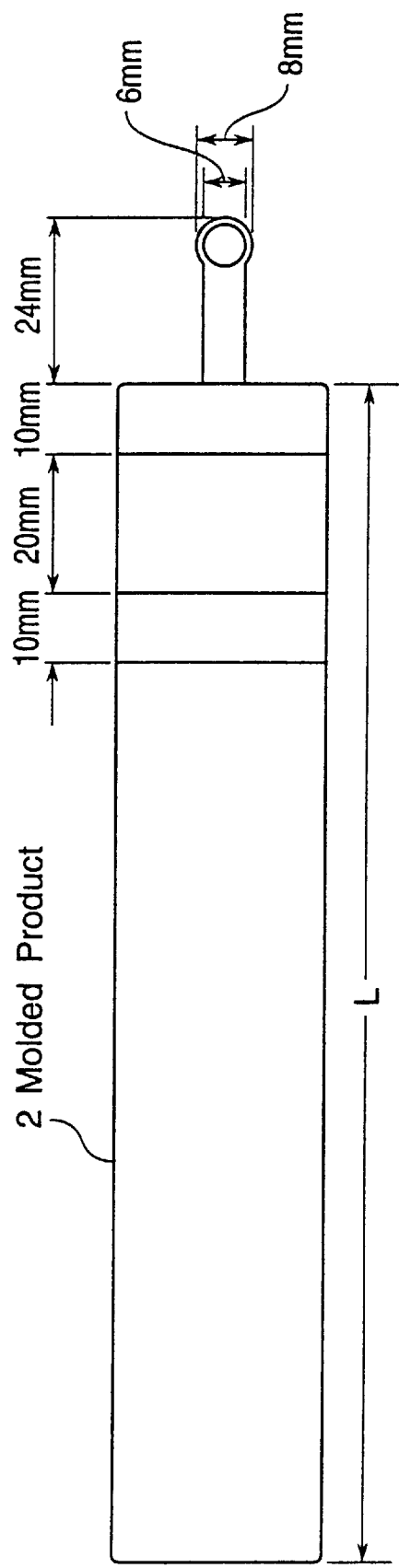
FIG. 2A is a top plan view of a vulcanized rubber foam-molded product used in the flowability test in Examples.
Figure 2B:
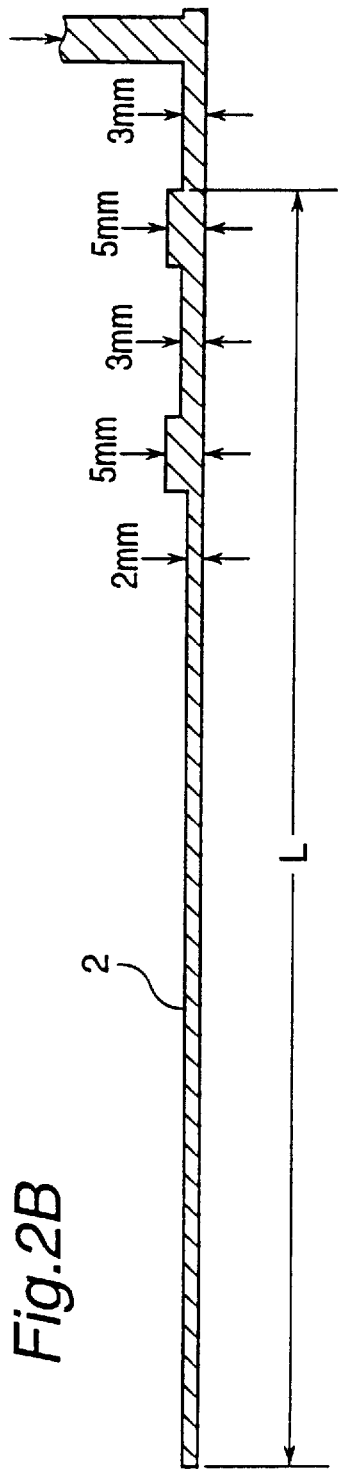
FIG. 2B is a vertical sectional view of the molded product.

Permanent compression set (%)=$[(t_0-t_1)\times 100]/(t_0-t_2)$ t0: height of specimen bfore compression t1: height of specimen after heat treatment and cooling for 30 min $t_2$: height of specimen compressed by 50% in measuring mold (5) Flowability test 10 g of a compounded rubber was cast into a mold of a transfer molding machine over a period of 10 seconds, and was vulcanized and foamed at 180° C. for 3.5 minutes. The resulting vulcanized rubber foam-molded product as shown in FIG. 2 was taken out of the mold. Then, the length (L in FIG. 2) of the foam-molded product was measured.

(6) Ease of demolding

In the above-mentioned transfer molding machine, a tubular vulcanized rubber foam-molded product as shown in FIG. 1 (outer diameter: 20 mm, inner diameter: 16 mm, length: 200 mm) was prepared. Immediately after the transfer molding, the foam-molded product with a core was taken out of the mold, and the core was drawn out. The tube was compressed by applying a load of 5 kg/20 cm to the upper part of the tube for 15 seconds. After the load was removed, the tube was allowed to stand for cooling, and the height of the tube was measured. The ease of demolding can be evaluated with the height of the tube.

Example 1

In a 1.7 liter Banbury mixer (manufactured by Kobe Seikosho K.K.), 100 parts by weight of the following ethylene/propylene/5-ethylidene-2-norbornene copolymer (EPT (1)), 20 parts by weight of a 1-butene polymer having a melting point (Tm, measured by DSC) of 120° C. and a melt flow rate (ASTM D 1238, 190° C., load of 2.16 kg) of 0.6 g/10 min, 5 parts by weight of zinc white, 2 parts by weight of stearic acid, 80 parts by weight of SRF carbon black (trade name: Asahi #50, available from Asahi Carbon K.K.) and 40 parts by weight of a paraffinic process oil (trade name: Diana Process Oil PW-380, available from Idemitsu Kosan Co., Ltd.) were kneaded at 145° C. for 5 minutes.

EPT (1)

Molar ratio of ethylene to propylene=72/28

Intrinsic viscosity (η) (measured in decalin at 135° C.)= 1.0 d/g

Iodine value=22

To 247 parts by weight of the kneadate obtained above were added 0.5 part by weight of 2-mercaptobenzothiazole (vulcanization accelerator, trade name: Sanceler M, available from Sanshin Kagaku K.K.), 0.5 part by weight of tetramethylthiuram disulfide (vulcanization accelerator, trade name: Sanceler TT, available from Sanshin Kagaku K.K.), 1.5 parts by weight of zinc di-n-butyldithiocarbamate (vulcanization accelerator, trade name: Sanceler BZ, available from Sanshin Kagaku K.K.), 0.5 part by weight of tetraethylthiuram disulfide (vulcanization accelerator, trade name: Sanceler TET, available from Sanshin Kagaku K.K.), 1.0 part by weight of sulfur, 7.0 parts by weight of azodicarbonamide (foaming agent, trade name: Vinyfor AC#3, available from Eiwa Chemical Industry Co., Ltd.) and 2.0 parts by weight of an urea type foaming assistant (trade name: Cellpaste 101, available from Eiwa Chemical Industry Co., Ltd.), and the mixture was kneaded by 8-inch rolls (temperature of front and back rolls: 50° C.) for 8 minutes, to prepare a rubber composition.

Then, the rubber composition was cast into a tubular mold of the above-mentioned transfer molding machine over a period of 10 seconds, and was vulcanized and foamed at a mold temperature of 180° C. for 3.5 minutes to obtain a vulcanized rubber foam-molded product (sponge rubber) as shown in FIG. 1.

Properties of the vulcanized rubber foam-molded product were measured by the aforesaid test methods.

The results are set forth in Table 1.

Example 2

The procedure of Example 1 was repeated, except that a propylene/ethylene/1-butene copolymer having a melting point (Tm) of 138° C., an ethylene content of 3% by mol and a 1-butene content of 2% by mol was used in place of the 1-butene polymer.

The results are set forth in Table 1.

Comparative Example 1

The procedure of Example 1 was repeated, except that the 1-butene polymer was omitted.

The results are set forth in Table 1.

Example 3

In a 1.7 liter Banbury mixer (manufactured by Kobe Seikosho K.K.), 70 parts by weight of the EPT (1) used in Example 1, 30 parts by weight of the following ethylene/propylene/5-ethylidene/2-norbornene copolymer (EPT (2)), 20 parts by weight of a 1-butene polymer having a melting point (Tm, measured by DSC) of 120° C. and a melt flow rate (ASTM D 1238, 190° C., load of 2.16 kg) of 0.6 g/10 min, 5 parts by weight of zinc white, 1 part by weight of stearic acid, 72 parts by weight of SRF-HS carbon black (trade name: Asahi #50H, available from Asahi Carbon K.K.) and 72 parts by weight of a paraffinic process oil (trade name: Diana Process Oil PW-380, available from Idemitsu Kosan Co., Ltd.) were kneaded at 140° C. for 5 minutes.

EPT (2)

Molar ratio of ethylene to propylene=78/22

Intrinsic viscosity (η) (measured in decalin at 135° C.)= 3.3 d/g

Iodine value=12

To 270 parts by weight of the kneadate obtained above were added 0.5 part by weight of 2-mercaptobenzothiazole (vulcanization accelerator, trade name: Sanceler M, available from Sanshin Kagaku K.K.), 0.5 part by weight of tetramethylthiuram disulfide (vulcanization accelerator, trade name: Sanceler TT, available from Sanshin Kagaku K.K.), 1.5 parts by weight of zinc di-n-butyldithiocarbamate (vulcanization accelerator, trade name: Sanceler BZ, available from Sanshin Kagaku K.K.), 0.5 part by weight of tetraethylthiuram disulfide (vulcanization accelerator, trade name: Sanceler TET, available from Sanshin Kagaku K.K.), 1.0 part by weight of sulfur, 7.0 parts by weight of azodicarbonamide (foaming agent, trade name: Vinyfor AC#3, available from Eiwa Chemical Industry Co., Ltd.) and 2.0 parts by weight of an urea type foaming assistant (trade name: Cellpaste 101, available from Eiwa Chemical Industry Co., Ltd.), and the mixture was kneaded by 8-inch rolls (temperature of front and back rolls: 50° C.) for 8 minutes, to prepare a rubber composition.

Then, the rubber composition was cast into a tubular mold of the above-mentioned transfer molding machine over a period of 10 seconds, and was vulcanized and foamed at a mold temperature of 180° C. for 3.5 minutes to obtain a vulcanized rubber foam-molded product (sponge rubber) as shown in FIG. 1.

Properties of the vulcanized rubber foam-molded product were measured by the aforesaid test methods.

The results are set forth in Table 1.

Comparative Example 2

The procedure of Example 3 was repeated, except that the 1-butene polymer was omitted.

The results are set forth in Table 1.

Comparative Example 3

The procedure of Example 1 was repeated, except that a propylene polymer having a melting point (Tm) of 164° C. and a melt flow rate (ASTM D1238, 230° C., load of 2.16 kg) of 10 g/10 min was used in place of the 1-butene polymer.

The results are set forth in Table 1.

TABLE 1

| | Ex. 1 | Ex. 2 | Ex. 3 | Comp. Ex. 1 | Comp. Ex. 2 | Comp. Ex. 3 |
|---|---|---|---|---|---|---|
| Amount of main component (parts by weight) | | | | | | |
| EPT | | | | | | |
| EPT (1) | 100 | 100 | 70 | 100 | 70 | 100 |
| EPT (2) | — | — | 30 | — | 30 | — |
| Crystalline polyolefin resin | | | | | | |
| 1-butene polymer | 20 | — | 20 | — | — | — |
| Propylene/ethylene/1-butene copolymer | — | 20 | — | — | — | — |
| Propylene polymer | — | — | — | — | — | 20 |
| Properties of un-vulcanized rubber | 7 | 8 | 17 | 6 | 12 | 11 |
| $ML_{1+4}$ (100° C.) | | | | | | |
| Properties of vulcanized rubber foam-molded product | | | | | | |
| Specific gravity (kg/m$^3$) | 560 | 550 | 580 | 630 | 620 | 570 |
| $T_B$ (MPa) | 2.3 | 2.4 | 3.5 | 2.1 | 3.3 | 3.0 |
| $E_B$ (%) | 300 | 290 | 360 | 330 | 420 | 380 |
| $T_R$ (N/cm) | 33 | 35 | 37 | 29 | 34 | 38 |
| Permanent compression set (%) | 33 | 36 | 31 | 35 | 34 | 37 |
| Flowability (mm) | 156 | 154 | 118 | 140 | 105 | 150 |
| Ease of demolding Height of tube (mm) | 19 | 19 | 19 | 19 | 19 | 7 |

Remarks:
Melting point of 1-butene polymer = 120 ° C.
Melting point of propylene/ethylene/1-butene copolymer = 138° C.
Melting point of propylene polymer = 164° C.

What is claimed is:

1. A foam processable rubber composition which comprises 100 parts by weight of an ethylene/α-olefin of 3 to 20 carbon atoms/non-conjugated polyene copolymer rubber (A), 5 to 50 parts by weight of a crystalline polyolefin resin (B) having a melting point (Tm), as measured by DSC, of 100 to 150° C., 0.5 to 50 parts by weight of a foaming agent (C), and a vulcanizing agent (D);

wherein the ethylene/α-olefin/non-conjugated polyene copolymer rubber (A) has the following properties:

(a) the molar ratio of ethylene to the α-olefin of 3 to 20 carbon atoms (ethylene/α-olefin) is in the range of 60/40 to 80/20, (b) the intrinsic viscosity (η), as measured in decahydronaphthalene at 135° C., is in the range of 0.7 to 2 dl/g, and (c) the iodine value is in the range of 10 to 50; and wherein the foam processable rubber composition is obtained by kneading a mixture comprising the ethylene/α-olefin/non-conjugated polyene copolymer rubber (A) and the crystalline polyolefin resin (B) with the foaming agent (C) and the vulcanizing agent (D) at a temperature of 40 to 80° C.

2. The rubber composition as claimed in claim 1, wherein the crystalline polyolefin resin (B) is a 1-butene polymer, or a propylene copolymer having a melting point, as measured by DSC, of 135 to 145° C.

3. A vulcanized rubber foam-molded product obtained by vulcanizing and foaming the rubber composition as claimed in claim 2.

* * * * *